United States Patent
Regner et al.

(10) Patent No.: US 8,418,833 B2
(45) Date of Patent: Apr. 16, 2013

(54) DEVICE FOR DIVIDING A TRANSPORT STREAM OF UPRIGHT CONTAINERS

(75) Inventors: Markus Regner, Muttensweiler (DE); Markus Habdank, Ulm (DE); Harald Mauz, Ehingen (DE); Sven Kuhnert, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 67 days.

(21) Appl. No.: 13/156,957

(22) Filed: Jun. 9, 2011

(65) Prior Publication Data
US 2011/0308915 A1    Dec. 22, 2011

(30) Foreign Application Priority Data
Jun. 22, 2010   (EP) ...................................... 10166789

(51) Int. Cl.
*B65G 47/68* (2006.01)
(52) U.S. Cl.
USPC .......................................................... 198/442
(58) Field of Classification Search .................. 198/442, 198/452, 436, 443, 445
See application file for complete search history.

(56) References Cited

U.S. PATENT DOCUMENTS

| | | | |
|---|---|---|---|
| 2,242,531 A | | 3/1941 | Marx |
| 2,371,419 A | * | 3/1945 | Bergmann .................... 198/451 |
| 2,656,910 A | * | 10/1953 | Kraus et al. .................... 198/445 |
| 2,692,713 A | * | 10/1954 | Silva ................................ 53/392 |
| 3,145,825 A | * | 8/1964 | Carter ............................ 198/444 |
| 3,462,912 A | * | 8/1969 | Anderson ........................ 53/544 |
| 3,599,789 A | * | 8/1971 | Kurczak ........................ 209/577 |
| 4,860,882 A | * | 8/1989 | Maeda et al. .................. 198/458 |
| 6,148,986 A | * | 11/2000 | Brink et al. ...................... 193/37 |
| 2005/0167239 A1 | | 8/2005 | Tarlton |

FOREIGN PATENT DOCUMENTS

| | | |
|---|---|---|
| DE | 964847 C | 3/1957 |
| DE | 4337646 C1 | 12/1994 |
| EP | 0888985 A1 | 1/1999 |
| FR | 2800304 A1 | 3/2001 |

OTHER PUBLICATIONS

European Search Report for EP 10166789.

* cited by examiner

*Primary Examiner* — Gene Crawford
*Assistant Examiner* — Keith R Campbell
(74) *Attorney, Agent, or Firm* — Brinks Hofer Gilson & Lione

(57) ABSTRACT

The device for dividing a transport stream consisting of one line of successively arranged upright containers into two partial transport streams, each partial transport stream consisting of one line of successively arranged upright containers, has a feed device for conveying the transport stream of containers, and two distribution lines arranged at an angle to each other, each of which serves to accept one of the partial transport streams of containers in a transfer area of the feed device, the feed device and the two distribution lines thus forming a Y-shaped intersection in the transfer area. At least one driven roller with a substantially vertical axis of rotation is arranged between the two distribution lines in the transfer area of the feed device.

6 Claims, 8 Drawing Sheets

DEVICE FOR DIVIDING A TRANSPORT STREAM OF UPRIGHT CONTAINERS

RELATED APPLICATIONS

The present patent document claims the benefit of priority to European Patent Application No. EP 10166789.7, filed Jun. 22, 2010, and entitled "DEVICE FOR DIVIDING A TRANSPORT STREAM OF UPRIGHT CONTAINERS," the entire contents of each of which are incorporated herein by reference.

FIELD AND BACKGROUND

The invention relates to a device for dividing a transport stream of upright containers into two partial transport streams.

Devices of this type are also called "Y-switches" and are used, for example, in the pharmaceutical industry to distribute bottles, ampules, or other containers.

There are many different ways in which devices of this type for dividing a transport stream of upright containers can be designed. Many of these devices use mechanical means such as rotating receiver plates, in the recesses of which the containers are received and from which they are then discharged into the desired distribution line. These types of designs are complicated and are not suitable for fragile containers.

In a simple embodiment of a device for dividing a transport stream of upright containers, the containers are conveyed along a single path by a feed device to the distribution point, where they are sorted into one or the other of the distribution lines as a function of the backpressure acting on them. Especially in the case of fragile containers, however, it is possible for the containers to become wedged in place and then crushed in the area of the transfer point by the pressure of the containers coming up from the rear.

BRIEF SUMMARY

It is an object of the present invention to provide a device for dividing a transport stream of upright containers which is also suitable for fragile containers and which ensures an especially reliable and speedy division of the transport stream.

According to an aspect of the invention, the device for dividing a transport stream consisting of one line of successively arranged upright containers into two partial transport streams, each partial transport stream consisting of one line of successively arranged upright containers, comprises a feed device for conveying the transport stream of containers, and two distribution lines arranged at an angle to each other, each of which serves to accept one partial transport stream of containers in a transfer area of the feed device, the feed device and the two distribution lines thus forming a Y-shaped intersection in the transfer area. At least one driven roller with a substantially vertical axis of rotation is arranged between the two distribution lines in the transfer area of the feed device.

This design ensures the simple, safe, and rapid division of the transport stream into two partial transport streams without the danger that fragile containers could be crushed.

According to a first embodiment, the predictability of the distribution behavior of the device is improved by providing precisely one roller and by arranging it asymmetrically, with a slight offset toward one of the two distribution lines.

It is especially advantageous for the roller to be offset slightly toward the left and to have a clockwise rotational direction, or for the roller to be offset slightly toward the right and to have a counterclockwise rotational direction. In this way, a preferential direction for the discharge of the containers toward one of the distribution lines is created, whereas, as a result of the free space which is formed, there is enough room for the next container coming up from the rear to move into the other distribution line.

In alternative embodiments, it is also possible to provide a plurality of rollers. The rollers are usually arranged one above the other, so that the frictional force between the rollers and the containers creates a preferential direction for the containers at several different points.

In one embodiment, the rollers can all be driven in the same direction. This is advantageous especially for large containers.

In another embodiment, the rollers can be driven in opposite directions, which is also especially suitable for large containers.

In an especially preferred modification of the latter embodiment, the position of the rollers can be shifted horizontally, preferably by pneumatic means. In this way, the division of the stream of containers into the two distribution lines can be accomplished with even greater precision and adapted to individual sets of boundary conditions.

It is preferable for at least one first roller to be adjustable slightly in the direction toward the left distribution line and to have a clockwise rotational direction, and for at least one second roller to be adjustable slightly in the direction toward the right distribution line and to have a counterclockwise rotational direction. In this way, depending on whether the right or the left roller is used, a preferential direction leading to one or the other of the two distribution lines can be created for the containers. At the same time, the distribution behavior can be adjusted on an individual basis.

The at least one roller is preferably made of a flexible plastic, so that even fragile containers can be safely distributed and so that at the same time adequate friction will be produced between the roller and the container.

So that the discharge rate in each of the two distribution lines can be controlled more accurately, each distribution line can comprise a transport device for discharging the containers, the speed of which is preferably individually adjustable. Influence can thus be exerted on the distribution of the containers by creating different backpressures in the two distribution lines.

The sum of the speeds of the transport devices in the two distribution lines is preferably greater than the speed of the feed device. As a result, the backpressure in the distribution lines is reduced, and the danger that a container will be crushed by the containers following it is further reduced.

BRIEF DESCRIPTION OF THE DRAWINGS

Additional features and advantages of the present invention can be derived from the following description, which refers to the drawings.

DETAILED DESCRIPTION OF SPECIFIC EMBODIMENTS

Figure 1:
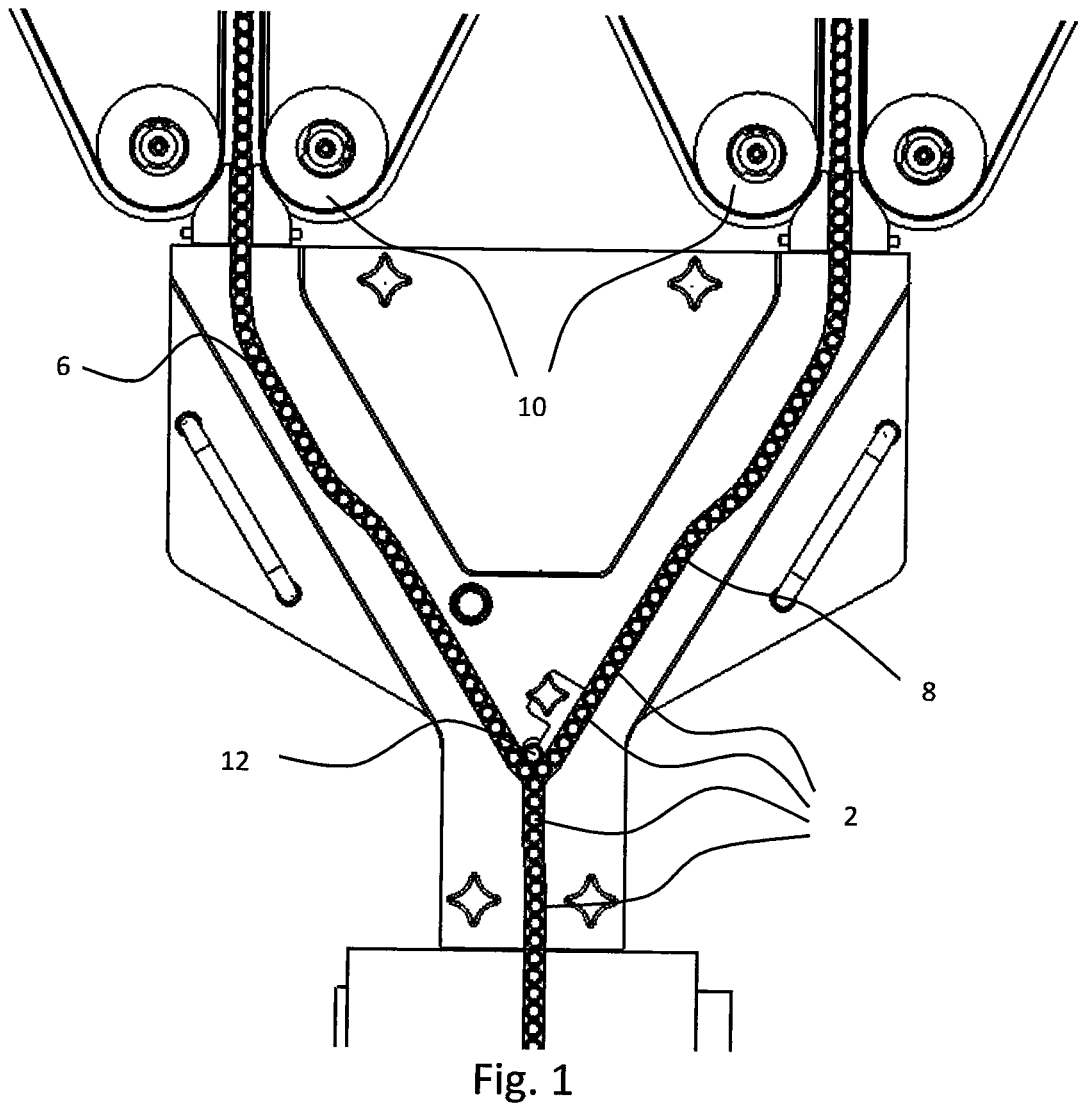
FIG. 1 is a top view of a device for dividing a transport stream of upright containers with a rotatable roller in the transfer area.

FIG. 1 shows the basic design of the device according to the invention. Upright containers 2 such as bottles, ampules, or the like are conveyed at high input speed (e.g., 800 items per minute) in a preferably single-path transport stream by a feed device 4. The feed device 4 is usually designed as a feeder belt, but any other feed device which moves the containers 2 continuously forward in the direction toward a transfer area can also be used. The containers 2 are preferably arranged in a closely-spaced row, preferably in contact with each other In the area at the end of the feed device 4, called the "transfer area" here, the transport stream of containers 2 is divided into two partial transport streams, which are taken up by two distribution lines 6, 8, arranged at an angle to each other. The distribution lines 6, 8 are preferably at an angle of 30-90° to each other, and more preferably at an angle of 45-60°, and are preferably arranged symmetrically to an axis which is formed by an imaginary extension of the feed device 4. Overall, a Y-shaped switch point is thus formed.

The containers 2 being conveyed along the two distribution lines 6, 8 are preferably carried away by a transport device 10 in each of the two distribution lines 6, 8 and conveyed at higher speed to a station for further processing. The transport device 10 can be designed as a conveyor belt, for example, on which the containers stand, or as some other type of conveying mechanism. In the exemplary embodiment shown here, the transport device 10 is located a certain distance away from the transfer area of the feed device 4, which means that the containers 2 are moved forward from the transfer area of the feed device 4 to the transport device 10 only by the back-pressure of the containers 2 being brought up from the rear in the distribution lines 6, 8. It would also be possible, however, for the transfer device 10 to be positioned closer to the transfer area of the feed device 4; that is, it could be positioned near the division point. It would also be possible to install an additional drive between the feed device 4 and the transfer device 10.

At least one rotatable roller 12, which comprises a substantially vertical axis of rotation, is provided in the area where the transport stream is divided into the two partial transport streams, or, more precisely, in the angular area between the two distribution lines 6, 8, directly at the end of the feed device 4. In the normal case, the at least one roller 12 is driven by a servomotor.

The roller 12 effectively counteracts the breakage of the containers 2 at the distribution point from the very beginning. The roller 12 does this by preventing the containers 2 from backing up at the "Y-intersection" of the switch point. The roller 12 preferably consists of a flexible plastic or rubber with a metal core or possibly only of metal, and it preferably rotates at a speed which is greater than the speed at which the containers 2 are being conveyed by the feed device 4. Because of the frictional force between the roller 12 and the containers 2, the containers are moved forward in the rotational direction of the roller 12 as soon as they make contact with the roller 12 and are thus pushed in the direction of one of the two distribution lines 6, 8. If no other adjustment is made to the downstream transport devices 10 in the distribution lines 6, 8, that is, if the transport devices 10 in the two distribution lines 6, 8 are running at the same speed, the back-pressure in the distribution line 6, 8 into which the preceding container 2 was pushed by the roller 12 will be increased, and as a result of this increased back-pressure, the succeeding container 2 will escape into the other distribution line 6, 8.

The roller 12 therefore serves to give the containers 2 a tendency to move in a preferred direction, as a result of which a free space is created for the following container 2 in the other direction, into which this container can then move.

There are several ways in which the at least one roller can be set up.

Figure 2:
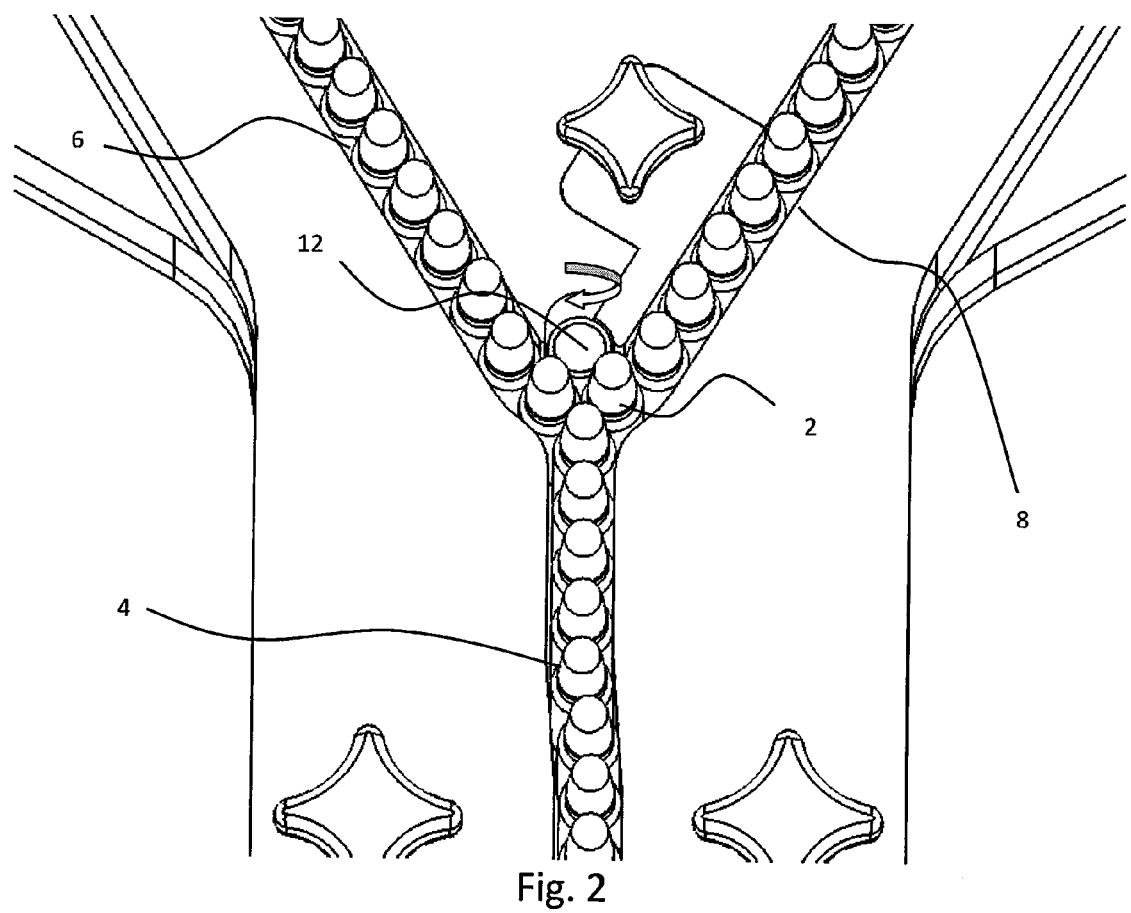
FIG. 2 is a schematic perspective view of another embodiment of the device for dividing a transport stream of upright containers with a rotatable roller in the transfer area.

FIG. 2 shows an embodiment in which only one roller 12 with a predetermined clockwise rotational direction is provided. In this exemplary embodiment, the roller 12 is shifted slightly toward the left in comparison with the axis of symmetry of the switch, i.e., the imaginary extension of the transport direction of the containers 2 in the feed device 4. As a result, because of the clockwise rotational direction of the roller 12, the left distribution line 6 is defined as the preferred direction; the second container 2, furthermore, has a slightly larger amount of space available to it in the area of the roller 12, which allows this container to escape into the right distribution line 8 without contacting the roller 12. This optimizes the uniformity with which the containers are distributed into the two distribution lines 6, 8.

The opposite effect is achieved when the roller 12 is shifted slightly to the right and is driven in the counterclockwise direction.

Figure 3:
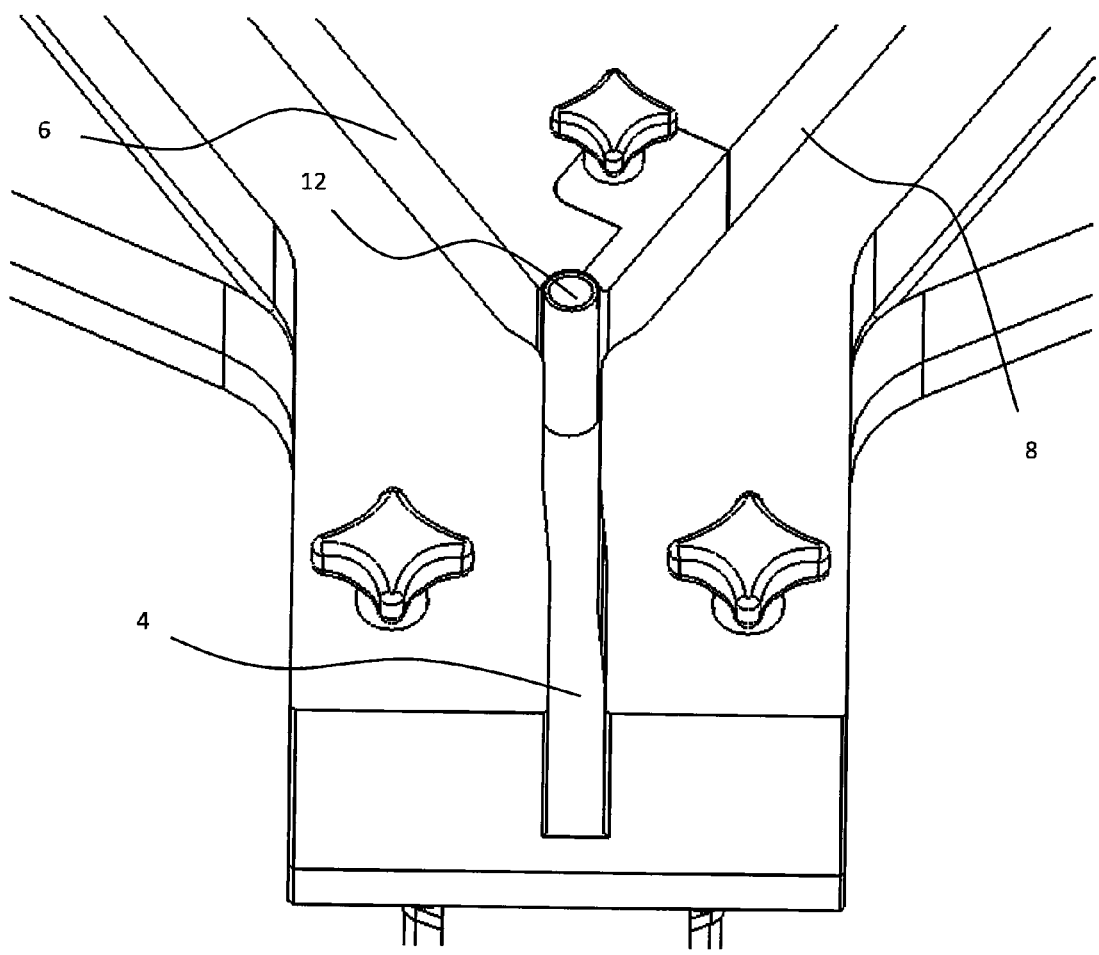
FIG. 3 is a schematic perspective view of another embodiment of the device for dividing a transport stream of upright containers with a rotatable roller in the transfer area.

In the exemplary embodiment shown in FIG. 3, the roller is arranged precisely in the center, that is, on the axis of symmetry of the device. The roller 12 can extend to a considerable height; that is, it can take on the shape of a tall cylinder, so that it can also guide large containers 2 reliably.

Figure 4:
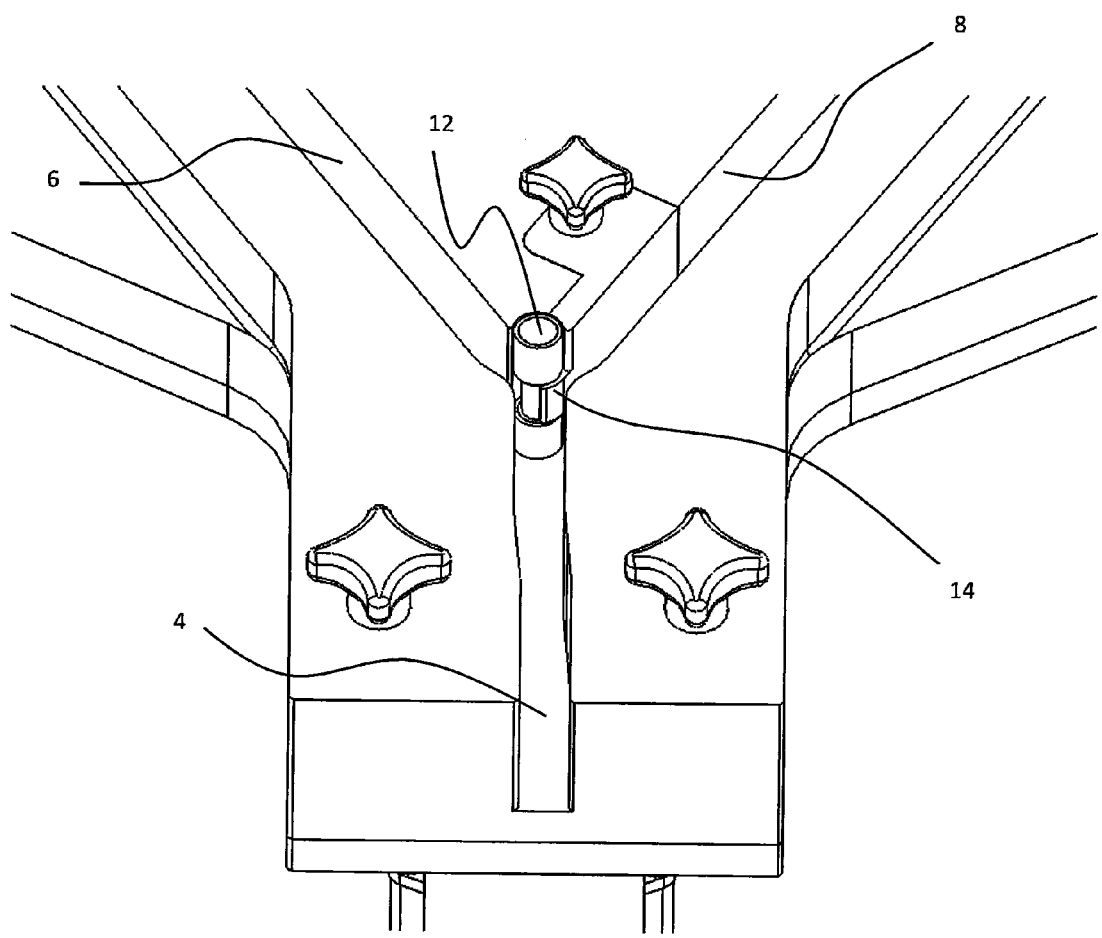
FIG. 4 is a schematic perspective view of another embodiment of the device for dividing a transport stream of upright containers with several rollers driven in the same direction in the transfer area.

It is also conceivable as an alternative that two smaller rollers 12 could be provided, one being arranged a short distance above the other. Both rollers would rotate in the same direction. This embodiment is shown in FIG. 4. In this design, as also in the case of the design according to FIG. 3, it can be advantageous to offset the roller or rollers 12 slightly toward the left or toward the right. In the embodiment shown in FIG. 4, in which the two rollers 12 are positioned in the center and the preferred direction is toward the left, a projection 14 can be provided in the area between the two rollers 12, for example, to deflect the containers 2 which are traveling toward the right distribution line 8 away from the roller 12 and thus to prevent them from interacting with the roller 12.

Figure 5A:
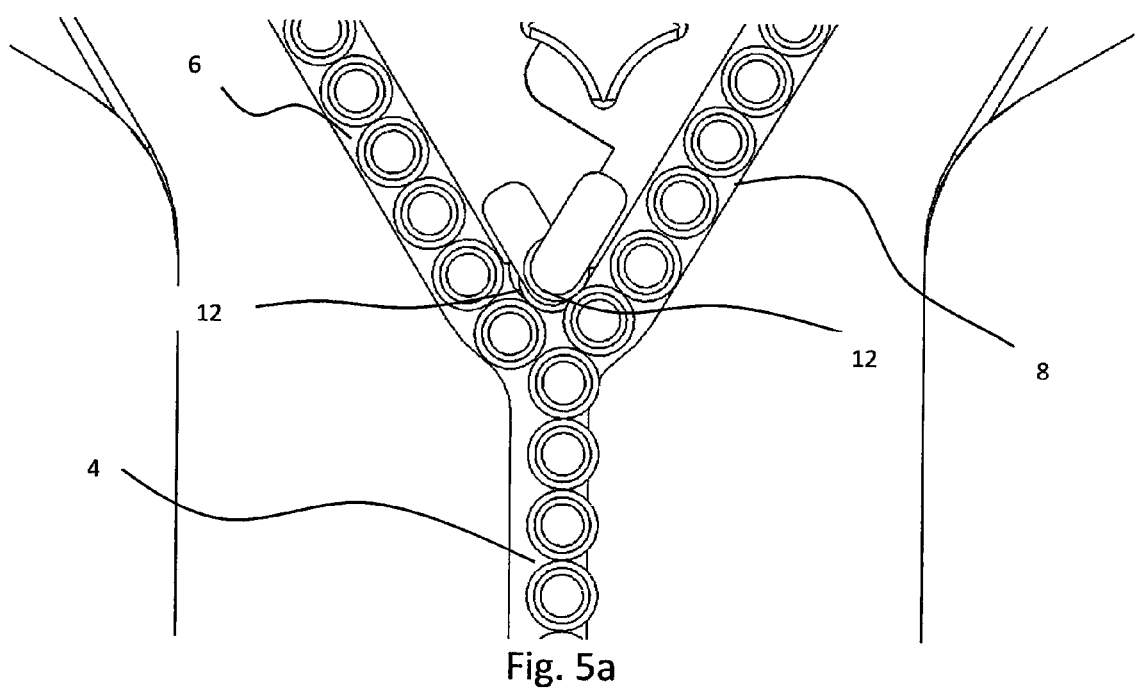
FIGS. 5a and 5b are top views of another embodiment of the device for dividing a transport stream of upright containers with two rollers driven in opposite directions, where in each case another roller is shifted forward or backward in the horizontal direction.
Figure 5B:
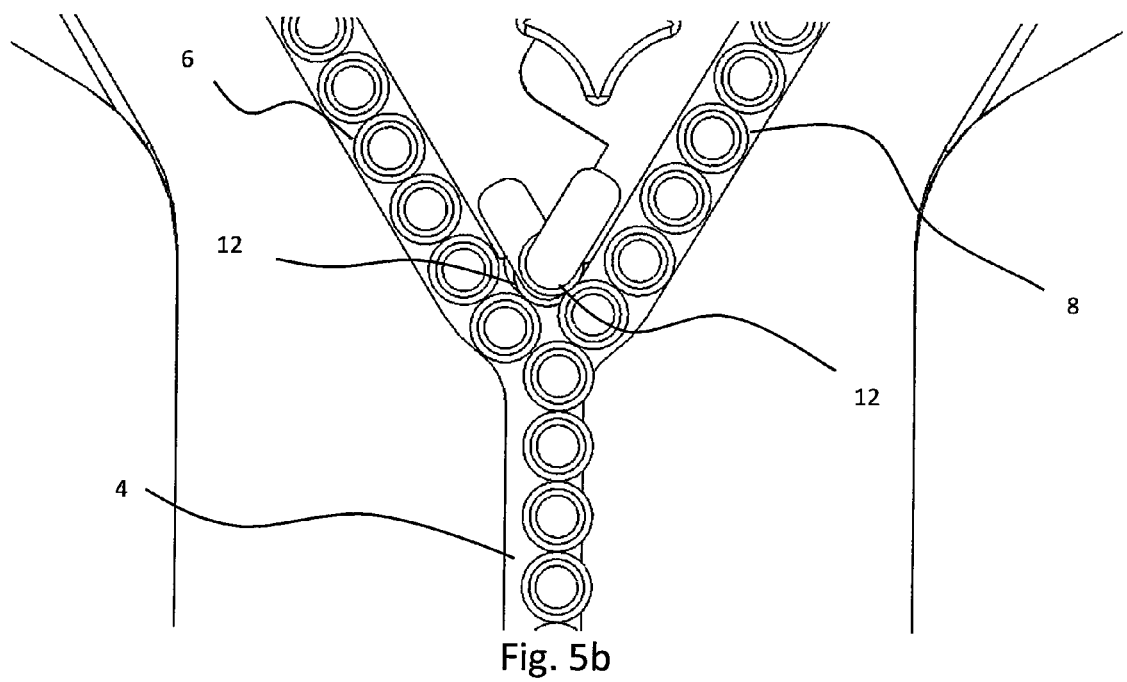

In the embodiment shown in FIGS. 5a and 5b, two rollers 12 are again provided, but in this case they rotate in opposite directions. The upper roller 12 preferably rotates in the clockwise direction, whereas the lower roller 12 preferably rotates in the counterclockwise direction. An adjusting mechanism is preferably provided to push one roller 12 forward, toward the desired distribution line 6, 8, that is, to push the upper roller 12 toward the left distribution line 6, or alternatively to push the lower roller 12 toward the right distribution line 8. The two different roller orientations are illustrated in FIGS. 5a and 5b, wherein, in FIG. 5a, the upper roller 12 is in the working position, whereas in FIG. 5b the lower roller 12 is in its working position. When in its working position, the roller 12 in question is shifted slightly toward one of the two distribution lines 6, 8.

Figure 6A:
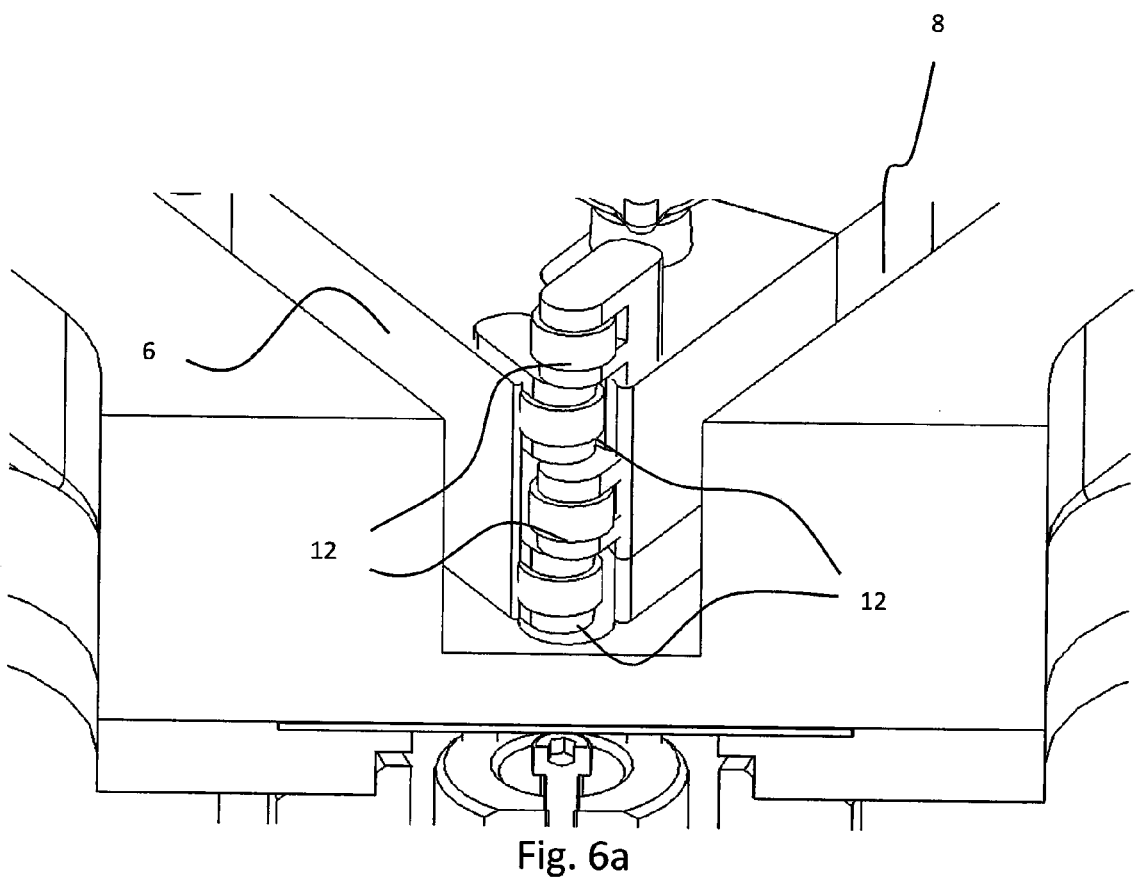
FIGS. 6a and 6b are schematic perspective views of another embodiment of the device for dividing a transport stream of upright containers with two pairs of rollers driven in opposite directions in the transfer area, wherein in each case another pair of rollers is shifted forward or backward in the horizontal direction.
Figure 6B:
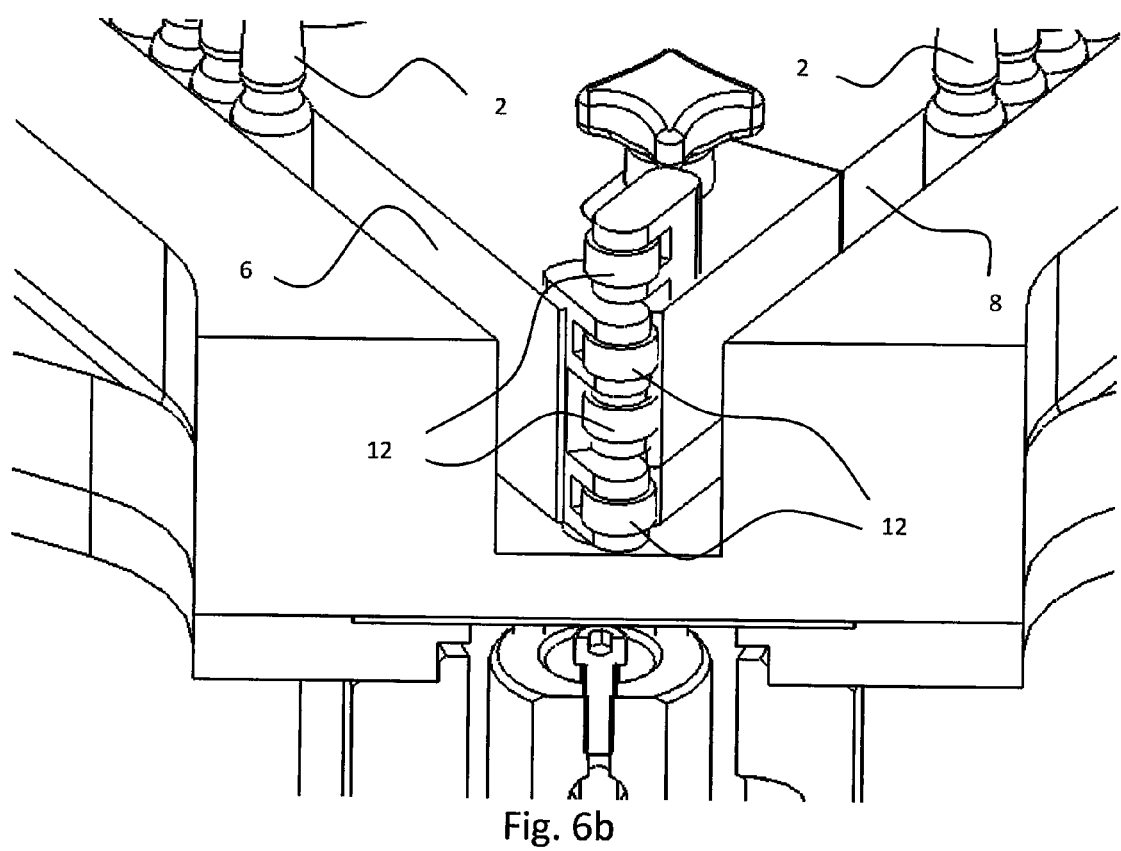

A similar exemplary embodiment is shown in FIGS. 6a and 6b. Here, however, four rollers 12 are provided. The bottom and the third roller 12, for example, can rotate counterclockwise and can be shifted toward the right, whereas the second and the top roller 12 can rotate in the clockwise direction and be shifted toward the left. The two rollers 12 of each pair rotating in the same direction are shifted simultaneously by pneumatic means, for example. In the exemplary embodiments of FIGS. 5a, 5b, 6a, and 6b, only the rollers driven in the same direction act on the containers 2, whereas the other rollers 12 rotating in the opposite direction are in a retracted position.

It is also possible, however, to use oppositely turning rollers 12 simultaneously, each of which transmits impulses to the containers 2 in the direction toward one of the two different distribution lines 6, 8.

The rate at which the containers are sent off into the two distribution lines 6, 8 can also be controlled by way of the downstream transport devices 10. To prevent the containers 2 even more effectively from being broken, the discharge rate settings of the two transport devices 10 should add up to more than 100% of the rate at which the feed device 4 delivers the containers 2.

The back-pressure in the two distribution lines 6, 8 can be changed by adjusting the discharge rates of the two transport devices 10. When it arrives at the distribution point, each container 2 will automatically take the path of least resistance and thus enter the distribution line 6, 8 with the lower back-pressure. By setting the speeds of the downstream transport devices 10 to different values, it is therefore possible to divide the containers 2 between the two distribution lines 6, 8 in a numerically nonuniform manner.

In combination with the transport devices 10 in the distribution lines 6, 8, it is therefore possible, through suitable choice of roller arrangements and their rotational direction, to distribute the containers 2 between the two distribution lines 6, 8 in almost any desired manner without fear that the back-pressure will be too high in the transfer area.

In the basic design, a uniform distribution between the two distribution lines 6, 8 can be achieved easily and very reliably through the use of at least one roller 12, because the driven roller 12 itself prevents the containers 2 from backing up at the distribution point.

The previously mentioned features of the various embodiments can also be used in combination with each other in cases where this would be advantageous for a specific application.

The invention claimed is:

1. A device for dividing a transport stream consisting of one line of successively arranged upright containers into two partial transport streams, each partial transport stream consisting of one line of successively arranged upright containers, the device comprising:
    a feed device for conveying the transport stream of containers;
    two distribution lines arranged at an angle to each other, each of which serves to accept one of the partial transport streams of containers in a transfer area of the feed device, the feed device and the two distribution lines thus forming a Y-shaped intersection in the transfer area; and
    precisely one driven roller with a substantially vertical axis of rotation arranged between the two distribution lines in the transfer area of the feed device offset asymmetrically toward one of the two distribution lines, wherein the roller is offset toward the left and has a clockwise rotational direction, or the roller is offset toward the right and has a counterclockwise rotational direction.

2. The device according to claim 1, wherein each distribution line comprises a transport device for carrying the containers away.

3. The device according to claim 2, wherein a sum of speeds of the transport devices of the two distribution lines is greater than a speed of the feed device.

4. The device according to claim 2, wherein the speed of each transport device is individually adjustable.

5. The device according to claim 3, wherein the speed of each transport device is individually adjustable.

6. The device according to claim 1, wherein the roller is made of metal.

* * * * *